United States Patent
Blakemore et al.

(10) Patent No.: US 6,607,694 B1
(45) Date of Patent: Aug. 19, 2003

(54) CONTROLLED RELEASE COOLANT ADDITIVE COMPOSITION

(75) Inventors: Thomas J. Blakemore, Flossmoor, IL (US); Yu-Sen Chen, Naper Ville, IL (US)

(73) Assignee: Dober Chemical Corp., Midlothian, IL (US)

( * ) Notice: Subject to any disclaimer, the term of this patent is extended or adjusted under 35 U.S.C. 154(b) by 0 days.

(21) Appl. No.: 09/539,914

(22) Filed: Mar. 31, 2000

(51) Int. Cl.$^7$ ................................................. C23F 11/08
(52) U.S. Cl. ............................ 422/7; 252/74; 428/407; 165/134.1; 123/198 E
(58) Field of Search ................... 422/7, 14; 252/74; 428/407; 165/134.1, 119; 123/198 E

(56) References Cited

U.S. PATENT DOCUMENTS

| | | |
|---|---|---|
| 3,977,992 A | 8/1976 | Hofacker |
| 4,561,981 A | 12/1985 | Characklis ................. 422/7 X |
| 4,673,527 A | 6/1987 | Goudy, Jr. et al. |
| 4,717,495 A | 1/1988 | Hercamp et al. |
| 4,728,452 A | 3/1988 | Hansen ...................... 422/7 X |
| 4,756,844 A | 7/1988 | Walles et al. |
| 4,839,177 A * | 6/1989 | Colombo et al. |
| 5,024,268 A * | 6/1991 | Cheadle et al. |
| 5,050,549 A | 9/1991 | Sturmon |
| 5,089,041 A | 2/1992 | Thompson et al. |
| 5,120,349 A | 6/1992 | Stewart et al. |
| 5,186,732 A | 2/1993 | Thompson et al. |
| 5,337,705 A | 8/1994 | Lane |
| 5,407,594 A | 4/1995 | Fry et al. |
| 5,565,106 A | 10/1996 | Sherbondy et al. ......... 210/700 |
| 5,643,351 A | 7/1997 | Lew et al. |
| 5,662,803 A | 9/1997 | Young ...................... 422/15 X |
| 5,741,433 A * | 4/1998 | Mitchell et al. ............ 422/7 X |
| 5,803,024 A * | 9/1998 | Brown |

FOREIGN PATENT DOCUMENTS

JP          08026875 A2  *  1/1996

OTHER PUBLICATIONS

Mitchell Wayne A. et al. Abstract of "Development of an extended–service coolant filter," ASTM Special Technical Publication (1999), STP 1335 (Engine Coolant Testing: Fourth Volume), pp. 409–425.*

* cited by examiner

*Primary Examiner*—Elizabeth McKane
(74) *Attorney, Agent, or Firm*—Stout, Uxa, Buyan & Mullins, LLP; Frank J. Uxa

(57) ABSTRACT

A controlled-release coolant additive composition for use in engine coolant systems comprising a core containing at least one coolant additive component and a polymeric coating encapsulating said core. The controlled released coolant additive composition slowly releases the coolant additive components to an engine coolant system, thereby delivering an effective concentration level of coolant additive components over an extended period. The controlled-release coolant additive composition maintains a minimum concentration level of active coolant additive components in the coolant system.

22 Claims, No Drawings

CONTROLLED RELEASE COOLANT ADDITIVE COMPOSITION

FIELD OF THE INVENTION

The present invention relates to a controlled-release additive composition for use in water treatment systems, particularly coolant and hot water systems, for example, engine coolant systems, and to a method of using said additive compositions. The controlled release additive composition comprises a water-soluble core containing at least one water treatment chemical and a polymeric coating material encapsulating said core which slowly releases the water treatment chemical into the water treatment system, thereby delivering an effective level of the water treatment chemical to the water treatment system over an extended period.

BACKGROUND OF THE INVENTION

Traditionally, additives such as anti-foulants, anti-scaling agents, corrosion inhibitors, buffering and pH agents, microcides and the like are added directly to water treatment systems as needed to prevent scale deposition, corrosion of metal surfaces and similar fouling of water treatment systems, as well to maintain proper pH levels. Typically, a system is monitored, such as by recovering and analyzing a sample, in order to determine the current level of particular chemical treatment agents. When the concentration of a particular agent falls below a desired level, additional agent is added to the system.

Similar methods have been employed for treating coolant systems. For example, the use of conventional antifreeze alone is sometimes insufficient to meet the demands of engine coolant systems. As a result, coolant additives (CA) are added to engine coolant systems to make up for the deficiencies of antifreeze formulations. Typically, coolant additives are added to the engine coolant system at each oil change in order to replace additives which have been diluted or depleted from the system.

Various methods of introducing coolant additives to the engine coolant system have been developed. For instance, a solid CA material may be added directly to the engine coolant system which dissolves in the coolant system. However, this method cannot maintain a steady concentration level of coolant additives within the system. Initially, there would be a high level of the coolant additives released into the system, and within a short time the coolant additives are depleted. Additionally, a significant draw back of this method is the danger of overdosing the system with particular additives which are initially released. The overdosing is dangerous in that it can result in erosion and corrosion problems.

Other attempts to have a good delivery of coolant additives to an engine system include the use of coolant filters which contain coolant additives. These devices operate as bypass filters with coolant flowing through the filter and extracting the coolant additive thereby. Although the use of coolant filters is an improvement over the use of a coolant additive block, the danger of overdosing still exists. For example, recently, there has been an interest in dramatically extending the coolant service interval from the typical two months interval to a once-a-year interval. This in turn increases the interval mileage from 15,000–20,000 miles up to approximately 120,000 miles, or more. Consequently, more additive must be placed into the filter to accommodate the longer time interval. However, the large amount of additive results in a high level of initial release, which is directly related to the creation of certain undesirable side effects to the coolant system, as discussed previously. Furthermore, the use of coolant filters failed to maintain a minimum level of coolant additives within the system.

Minimal attempts have been made in the prior art to address particular water treatment systems by using controlled release coatings. For example, Characklis in U.S. Pat. No. 4,561,981 (issued Dec. 31, 1985) disclosed a method for controlling, preventing or removing fouling deposits, particularly in pipelines, storage tanks and the like by mircroencapsulating fouling control chemicals in a slow release coating. The coating material is described as being any material compatible with the fouling control chemical which is capable of sticking to the fouling deposit site. However, the coating materials as disclosed by Characklis may dissolve in an engine coolant system and create further corrosion problems.

Recently, Mitchell et al. in U.S. Pat. No. 6,010,639 disclosed that a terpolymer may be used as a coating for coolant additives.

However, despite the efforts of the prior art, a need still exists for a controlled release coolant treatment composition.

SUMMARY OF THE INVENTION

Accordingly, the present invention provides a controlled release additive composition for water treatment systems. This invention provides for delayed and more effectively complete release of treatment additive components, to maintain a consistent level of treatment additive components in the water system over an extended period of time. Preferably, the treatment additive components are coolant additive components. Additionally, the water system is preferably a coolant system.

More particularly, the present invention provides a controlled release coolant additive composition for engine coolant systems which slowly releases one or more coolant additive (CA) components into the engine coolant system.

In one embodiment, a controlled release coolant composition has a core containing a water-soluble coolant additive component and a coating substantially surrounding the core.

In a preferred embodiment, the coating is a polymer made up of units from no more than two monomers. More preferably, the units include vinylacetate and vinyl versatate.

The coolant additive component has at least one active ingredient selected from the group consisting of buffering components, captivation liner pitting inhibitors, metal corrosion and hot surface corrosion inhibitors, defoaming agents, hot surface deposition, scale inhibitors, dispersant agents, organic acids, surfactants and mixtures thereof.

In a preferred embodiment, the coolant additive component also includes sodium nitrite, sodium nitrate and sodium molybdate.

In another embodiment, a method is provided for maintaining an effective concentration of at least one engine coolant additive component in an engine coolant system. The method includes steps of circulating the coolant of the system through a filter which contains the controlled release coolant additive composition.

Each and every feature described herein, and each and every combination of two or more of such features, is included within the scope of the present invention provided that the features included in such a combination are not mutually inconsistent.

DETAILED DESCRIPTION OF THE INVENTION

The present invention relates to a controlled release coolant additive composition for use in coolant or hot water systems, particularly for use in engine coolant systems. The controlled release coolant additive (CA) composition comprises a core containing a water-soluble coolant additive component and a coating encapsulating said core which enables the slow release of the coolant additive component into the engine coolant system. Any type of coating conventionally known in the art which provides controlled-release properties may be used in the present invention.

In a preferred embodiment, the coating is a polymer dispersion. More preferably, the polymer dispersion has the following properties:

1. Low viscosity: The polymer dispersion should be of a low to medium viscosity. When the viscosity is too high, it would become impossible to pump the polymer dispersion through a coating system. This would cause the line and spray gun to become plugged. Also, in this case, the droplets of polymer dispersion would be too thick and difficult to lose moisture. They would not have the desired level of dryness before they reach the tablet surface. Therefore, the polymer would not form a good and homogeneous coating.

It should be noted that reducing the viscosity of a polymer dispersion through dilution with water is not always a viable solution. Often the dilution leads to changes of physical properties for the polymer dispersion and renders the polymer not appropriate for coating applications.

2. Low film forming and glass transition temperatures: Every polymer has its own characteristic film forming temperature and glass transition temperature, $T_g$. To form a good coating, the polymer must have a film forming temperature lower than the operating temperatures inside the chamber of the drum coater in the coating process. A high $T_g$ would lead to a brittle and fragile film which may easily peel off. Generally, a polymer with lower film forming temperature and $T_g$ forms better film than those polymers with higher corresponding temperatures.

3. Good film forming ability onto tablet surface: In the early stage of coating process, the polymer has to have good adherence to the tablet surface, so that the coating film can gradually build up. The polymer particles should pack well without large spaces or holes in between. This can be examined and confirmed under a microscope. Typically the polymer with small particle size will result in better packing. Also, the polymer must possess good elasticity; otherwise, the coating would crack, especially upon cooling.

4. Insolubility of the polymer in coolants under engine operating conditions: Typically the engine coolants are composed of water and ethylene glycol in equal volumes with a pH of 7.0 to 11.0 and operating temperatures of 170 degrees F to 210 degrees F. These are very demanding conditions for polymer coatings to remain insoluble and stable for 1,000 hours or longer.

If the polymer coating dissolves in coolant solutions, it will lose the slow release function. Moreover, polymer deposits on the engine metal surfaces may be detrimental to the engine. Therefore, it is preferred that the polymer is insoluble in coolant solutions.

5. Stability of polymer coating in coolants under engine operating conditions: Many polymers degrade because they undergo alkaline hydrolysis reaction in coolants under engine operating conditions. As degradation or dissolution occurs, the coating is damaged. As a result, the coating forms holes and loses the control of slow release. Subsequently, all chemical ingredients rapidly enter the bulk coolant.

6. Good release rates for ingredients: The release must be gradual, effective and substantially complete preferably at about 500 service hours (20,000 miles), more preferably about 1,000 service hours (40,000 miles) and even more preferably about 2,500 service hours (100,000 miles) or longer.

Without wishing to limit the invention to any particular mechanism or theory of operation, it is believed that the release of ingredients from the tablet core into the bulk coolant solution involves three steps: (a) coolant solution enters the inner tablet core through the polymer.coating, (b) chemical ingredients of the tablet dissolve in contact with coolant and (c) the resulting highly concentrated solution diffuses through the polymer coating back into the bulk coolant. The path and size of channels, microscopically, within the polymer coating, which are characteristics of each specific polymer and are closely related to the physical properties of each polymer in coolant solutions at elevated temperatures, control the kinetics of these actions.

In one embodiment, film forming polymers are found to have these desired properties. Suitable film forming polymers include, for example, homopolymers, copolymers and mixtures thereof, wherein the monomer units of the polymers are preferably derived from ethylenically unsaturated monomers.

A particularly useful ethylenically unsaturated monomer is compound I with the formula $(R_1)(R_2)(R_3)C-COO-(CH=CH_2)$, wherein $R_1$, $R_2$ and $R_3$ are saturated alkyl chains. In one embodiment, $R_3$ of compound I is $CH_3$, and $R_1$ and $R_2$ of compound I have a total of about 2 to about 15 carbons; such a molecule is also known as a vinylversatate. In a preferred embodiment, $R_3$ is $CH_3$, and $R_1$ and $R_2$ have a total of about 5 to about 10 carbons. In a more preferred embodiment, $R_3$ is $CH_3$, and $R_1$ and $R_2$ have a total of 7 carbons., i.e. $R_1+R_2=C_7H_{16}$.

In another embodiment, each of the $R_1$, $R_2$, and $R_3$ of compound I is a single chemical element. For example, the element may be a halogen, preferably a chloride. More preferably, the element may be a hydrogen. Compound I having a hydrogen as the element for $R_1$, $R_2$ and $R_3$ is known as vinylacetate.

In another embodiment, $R_1$ of compound I may be a single chemical element, and $R_2$ of compound I may be a saturated alkyl chain.

Other examples of ethylenically unsaturated monomers include: Monoolefinic hydrocarbons, i.e. monomers containing only carbon and hydrogen, including such materials as ethylene, ethylcellulose, propylene, 3-methylbutene-1, 4-methylpentene-1, pentene-1, 3,3-dimethylbutene-1, 4,4-dimethylbutene-1, octene-1, decene-1, styrene and its nuclear, alpha-alkyl or aryl substituted derivatives, e.g., o-, - or p-methyl, ethyl, propyl or butyl styrene, alpha-methyl, ethyl, propyl or butyl styrene; phenyl styrene, and halogenated styrenes such as alpha-chlorostyrene; monoolefinically unsaturated esters including vinyl esters, e.g., vinyl propionate, vinyl butyrate, vinyl stearate, vinyl benzoate, vinyl-p-chlorobenzoates, alkyl methacrylates, e.g., methyl, ethyl, propyl, butyl, octyl and lauryl methacrylate; alkyl crotonates, e.g., octyl; alkyl acrylates, e.g., methyl, ethyl, propyl, butyl, 2-ethylhexyl, stearyl, hydroxyethyl and tertiary butylamino acrylates, isopropenyl esters, e.g., isopropenyl acetate, isopropenyl propionate, isopropenyl butyrate and isopropenyl isobutyrate; isopropenyl halides, e.g., isopropenyl chloride; vinyl esters of halogenated acids, e.g., vinyl alpha-chloroacetate, vinyl alpha-chloropropionate and vinyl alpha-bromopropionate; allyl and methallyl compounds, e.g., allyl chloride, ally alcohol, allyl cyanide, allyl chlorocarbonate, allyl nitrate, allyl formate and allyl acetate and the corresponding methallyl compounds; esters of alkenyl alcohols, e.g., beta-ethyl allyl alcohol and beta-propyl allyl alcohol; halo-alkyl acrylates, e.g., methyl alpha-chloroacrylate, ethyl alpha-chloroacrylate, methyl alphabromoacrylate, ethyl alpha-bromoacrylate, methyl alpha-fluoroacrylate, ethyl alpha-fluoroacrylate, methyl alpha-iodoacrylate and ethyl alpha-iodoacrylate; alkyl alpha-cyanoacrylates, e.g., methyl alpha-cyanoacrylate and ethyl alpha-cyanoacrylate and maleates, e.g., monomethyl maleate, monoethyl maleate, dimethyl maleate, diethyl maleate; and fumarates, e.g., monomethyl fumarate, monoethyl fumarate, dimethyl fumarate, diethyl fumarate; and diethyl glutaconate; monoolefinically unsaturated organic nitriles including, for example, fumaronitrile, acrylonitrile, methacrylonitrile, ethacrylonitrile, 1,1-dicyanopropene-1, Another preferred copolymer for coating is made up of acrylate-vinylversatate. NeoCAR 820 sold by Union Carbide is the preferred acrylate-vinylversatate copolymer used for forming coatings.

In another embodiment, the polymer for coating is made up of a homopolymer. In a preferred embodiment, the monomer unit of the homopolymer is ethylcellulose. In a more preferred embodiment, ethylcellulose used for forming coatings is purchased from Dow Chemical sold under the trademark ETHOCEL S10, S20, S100, and preferably S45.

ETHOCEL has the following molecular structure, wherein "Et" is $C_2H_5$:

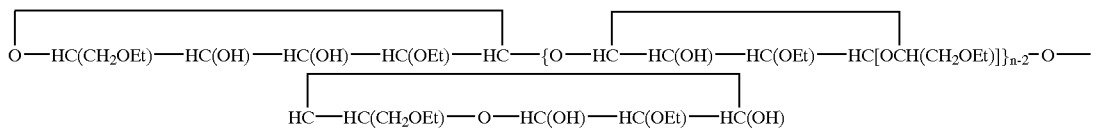

3-octenonitrile, crotononitrile and oleonitrile; monoolefinically unsaturated carboxylic acids including, for example, acrylic acid, methacrylic acid, crotonic acid, 3-butenoic acid, cinnamic acid, maleic, fumaric and itaconic acids, maleic anhydride and the like. Amides of these acids, such as acrylamide, are also useful. Vinyl alkyl ethers and vinyl ethers, e.g., vinyl methyl ether, vinyl ethyl ether, vinyl propyl ether, vinyl n-butyl ether, vinyl isobutyl ether, vinyl 2-ethylhexyl ether, vinyl-2-chloroethyl ether, vinyl propyl ether, vinyl n-butyl ether, vinyl isobutyl ether, vinyl-2-ethylhexyl ether, vinyl 2-chloroethyl ether, vinyl cetyl ether and the like; and vinyl sulfides, e.g., vinyl beta-chloroethyl sulfide, vinyl beta-ethoxyethyl sulfide and the like. Other useful ethylenically unsaturated monomers are styrene, methyl methacrylate, and methyl acrylate.

In one embodiment, the polymer forming the coating is made up of a copolymer of vinylacetate and vinylversatate. In a preferred embodiment, about 45% to about 90% by weight of the units are from vinylacetate and about 10% to about 55% by weight of the units are from vinylversatate. In more preferred embodiment, about 65% by weight of the units are from vinylacetate and about 35% by weight of the units are from vinylversatate.

In one preferred embodiment, the vinylversatate used is sold under the trademark VEOVA 10 sold by Shell Chemicals. In a particularly preferred embodiment, the water-based emulsion polymer is a vinylacetate-vinylversatate copolymer, sold under the trademark EMULTEX VV575 sold by Harlow Chemical Co. (England). Additionally, a surfactant may also be added to stabilize the dispersion. In a preferred embodiment, the polymer solid in the dispersion is about 54% to about 56% by weight of active polymer solid.

EMULTEX VV575 is particularly advantageous because it meets all of the six requirements for a good coating as set forth above. That is, it (1) exhibits a viscosity low enough for coating processing without difficulties, (2) has a film forming temperature of 10 degrees C and a glass transition temperature, $T_g$, of 11 degrees C, low enough for forming a.good coating, (3) has a fine to medium particle size of 0.37 micron and forms an elastic coating, (4) is insoluble in coolants at operating engine conditions, (5) is stable in coolants at operating engine conditions and (6) gives excellent release rates for ingredients, preferably ingredients in DCA-4+tablets.

Specific properties of the various ETHOCEL's are determined by the number of anhydrous units in the polymer chain (expressed by the molecular weight or the solution viscosity), and, the degree of ethoxyl substitution (expressed as the percent of hydroxyl group, —OH, in cellulose substituted by ethoxyl group, —$OC_2H_5$). The preferred ETHOCEL S45 has a solution viscosity of about 41 to about 49 cP and about 48 to about 49.90%. ethoxyl content. The viscosity is for a 5% solution in 80/20 toluene/ethanol measured at 25 degrees C in an Ubbelohde viscometer.

The CA component comprises a mixture of conventional inhibiting and buffering agents typically used in engine coolant systems. Preferably, the CA component comprises (1) a buffering component to maintain a neutral or alkaline pH, including for example, alkali metal salts or sodium phosphates, borates and the like, (2) a cavitation liner pitting inhibitor component, including for example, alkali metal or sodium nitrites, molybdates and the like, (3) a metal corrosion and hot surface corrosion inhibitor component, including for example, alkali metal and.sodium nitrates and silicates, carboxylic acids, azoles, sulfonic acids, mercaptobenzothiazoles, metal dithiophosphates and metal dithiocarbonates (one particular corrosion inhibitor that has been found to be highly, satisfactory and is preferred is a phenolic anti-oxidant, 4,4'-methylenebis (2,6-di-tertbutylphenol) that is commercially available under the trademark Ethyl 702 manufactured by Ethyl Corporation), and the like, (4) a defoaming agent component including for example, silicone defoamers, alcohols such as polyethoxylated glycol, polypropoxylated glycol or acetylenic glycols and the like, (5) a hot surface deposition and scale inhibitor component including for example, phosphate esters, phosphino carboxylic acid, polyacrylates, styrene-maleic anhydride copolymers, sulfonates and the like, (6) a dispersing component, including for example, non-ionic and/or anionic surfactants such as phosphate esters, sodium alkyl sulfonates, sodium aryl sulfonates, sodium alkylaryl suilfonates, linear alkyl benzene sulfonates, alkylphenols, ethoxylated alcohols, carboxylic esters and the like, (7) an organic acid, including for example adipic acid, sebacic acid and the like, (8) an anti-gel such as that disclosed by Feldman et al in U.S. Pat. No. 5,094,666, the content of which is incorporated in its entirety herein by reference (for example, such anti-gel additive comprises copolymers of ethylene and vinyl esters of fatty acids with molecular weight of 500–50,000; or Tallow amine salt of phthalic anhydride, used at 0.01–0.2; or Tallow amine salt of dithio benzoic acid, used at 0.005–0.15%; or 4-hydroxy, 3,5-di-t-butyl dithiobenzoic acid; or ethylene-vinylacetate copolymers).

Typical CA components contain a mixture of one or more of the active components provided in the following Table 1.

TABLE 1

CA Active Components

| Component | Function | Range % |
| --- | --- | --- |
| Alkali metal or ammonium phosphates | corrosion inhibitor/ buffering agent | 0–80 |
| Alkali metal or ammonium borate | corrosion inhibitor/ buffering agent | 0–80 |
| Alkali metal or ammonium nitrites | cavitation liner pitting/corrosion inhibitor | 4–60 |
| Alkali metal or ammonium molybdates | cavitation liner pitting/corrosion inhibitor | 4–60 |
| Alkali metal or ammonium nitrates | corrosion inhibitor | 0–40 |
| Alkali metal or ammonium silicates | corrosion inhibitor | 0–40 |
| Alkali metal or ammonium salts of one or more neutralized dicarboxylic acids | corrosion inhibitor | 1–15 |
| Tolyltriazole | corrosion inhibitor | 1–15 |
| Dispersants (e.g. polyacrylic acid, phosphino carboxylic acid, phosphate esters, styrene-maleic anhydride copolymers, polmaleic acid, sulfonates and sulfonate copolymers) | deposition and scale inhibitor | 0–15 |
| Defoamers (e.g. silicones, polyethyoxylated glycol, polypropoxylated glycol, acteylenic glycols) | foam inhibitor | 0–3 |

In one embodiment, the CA component includes nitrite compounds. In a preferred embodiment, the CA component includes a mixture of nitrite compounds and molybdate compounds to maintain a minimum concentration level of about 800 ppm of nitrite or a mixture of nitrite and molybdate in the coolant system, with the proviso that the minimum level of nitrite in the coolant system is about 400 ppm. Such additive is sold by Fleetguard under the trademark DCA-2+, which includes borate, silicate, organic acids, tolytriazole, scale inhibitors, surfactants and defoamers, in addition to nitrite and molybdate.

In a more preferable embodiment, the CA component includes a mixture of nitrite, nitrate and molybdate compounds. In a more preferred embodiment, the CA additive component comprises nitrite, nitrate, phosphate, silicate, borate, molybdate, tolyltriazole, organic acids, scale inhibitors, surfactants and defoamer. Such an additive is sold by Fleetguard under the trademark DCA-4+.

The CA component may be in solid, granular or particulate form provided that it does not decompose or melt at processing temperatures. Preferably, the CA component is molded in the form of a pellet or tablet which may have either a spherical or irregular shape. The CA pellet or tablet should be of sufficient size to provide the steady controlled release of the CA components into the coolant system over the desired period of time. Further, when the CA pellet or tablet is used in a filtering environment, it should be larger than the pores or orifices of the filter. Generally, a spherical pellet or tablet should have a diameter on the order of from about $\frac{1}{32}$" to about 3.0", preferably from about $\frac{1}{32}$" to about $\frac{1}{2}$", and more preferably from about $\frac{1}{8}$" to about $\frac{1}{2}$". An irregularly shaped pellet or tablet should be on the order of from about $\frac{1}{16}$" times $\frac{1}{16}$" to about 3.0" times 3.0", preferably from about $\frac{1}{8}$" times $\frac{1}{8}$" to about 1.5" times 1.5" and more preferably from about $\frac{3}{16}$" times $\frac{3}{16}$" to about $\frac{1}{2}$" times $\frac{1}{2}$".

The formation of the CA component into a pellet or tablet is dependent upon the mixture of materials contained therein. For example, when the CA component contains a sufficient amount of a dispersing agent or a mixture of dispersing agents, the dispersing agent or mixture also may function as a binder, thereby allowing the component to be molded or compressed directly into the form of a pellet or tablet. If the CA component does not compact well, a binder must be added to the CA component in order to mold or compress it into a pellet or tablet. Suitable binders include, for example, polyvinyl pyrrolidone, sodium acrylate, sodium polyacrylate, carboxymethylcellulose, sodium carboxyinethylcellulose, corn starch, microcrystalline cellulose, propylene glycol, ethylene glycol, sodium silicate, potassium silicate, methacrylate/acrylate copolymers, sodium lignosulfonate, sodium hydroxypropylcellulose, preferably hydroxyethylcellulose, and water.

Preferably, the CA component to be molded or compressed into a pellet or tablet further comprises a die release agent. Suitable die release agents include, for example, calcium stearate, magnesium stearate, zinc stearate, stearic acid, propylene glycol, ethylene glycol, polyethylene glycol, polypropylene glycol, polyoxypropylene-polyoxyethylene block copolymers, microcrystalline cellulose, kaolin, attapulgite, magnesium carbonate, fumed silica, magnesium silicate, calcium silicate, silicones, mono-and dicarboxylic acids and corn starch.

To form a controlled release coolant additive composition, the polymeric coating may be applied to the CA composition core by spray coating, microencapsulation or any other coating technique well known to practitioners in the art. Preferably, the polymeric coating is an aqueous dispersion latex which is applied to the CA core pellet or tablet by drum or pan coating. The amount of coating to be applied to the CA core is dependent upon the desired controlled release characteristics of the resulting coated tablet or pellet. An increase in the amount of coating will result in a decrease of the rate of release of the CA component. Preferably, the weight percent of the coating is from about 1.0 to about 40.0% based on the total weight of the CA tablet, more preferably from about 2% to about 37% by weight and most preferably from about 10 to about 35% by weight.

In one broad embodiment, a method is provided for maintaining an effective concentration of at least one engine coolant additive component in an engine coolant system. The method includes steps of placing the coolant additive composition, such as the ones described herein, in contact with the engine coolant. Although the coated CA tablets or pellets may be introduced directly into the coolant system, such a delivery method can result in the polymeric coating itself fouling the system. In order to prevent the water insoluble polymeric coating from being introduced into the coolant system along with the CA additive, the coated tablets are placed within a filtering environment such that the filter can release the water-soluble CA component into the coolant system but trap and retain the larger particles of polymeric coating. The selection of such a filtering environment is dependent on whether the coolant system is a circulating or non-circulating system. In circulating systems such as engine coolant systems, coolant filters currently are being utilized in order to introduce chemical coolant additives to the cooling system. An example of such a filter device is the WF2171 Coolant filter, sold by Fleetguard.

The following non-limiting examples illustrate certain aspects of the present invention.

EXAMPLES

The release characteristics of a controlled release coolant additive composition were tested in a flask. In particular, the coating used for the coolant additive composition tested was vinylacetate-vinylversatate copolymer(EMULTEX VV575) and the additive component used was DCA-4+tablet. The finished tablet, weighing 1.462 grams on the average, is of 11 mm diameter and contains 26.8% by weight of EMULTEX VV575 copolymer solid. The test coolant solution was prepared by mixing equal volume of ethylene glycol and, de-ionized water. It also contains potassium phosphate $K_2HPO_4$ at 2,000 mg/L concentration. The pH of the test solution was adjusted to 10.3 with sodium hydroxide.

Five coated tablets were stacked inside a polypropylene tube of 92 mm in length, and 14 mm in diameter. The tube, with one side open, has a total of 18 holes distributed evenly around the wall and one hole on the bottom of the tube. Each hole has a diameter of 4 mm.

The tube with the coated tablets was hung inside a 3-neck, 1-Liter, flask equipped with a magnetic stir bar and a cold-water condenser. Then, the flask was filled with 0.900 liters of test coolant solution.

Subsequently, with mixing, the solution was heated to, and kept at, 190±3 degrees F. The release of chemical ingredients from the DCA-4+tablets into the solution was monitored. Samples were taken and analyzed for nitrite, nitrate and molybdate. The percent release with time for each ingredient was calculated as the ratio of measured concentration and expected concentration at full release. The results are shown as percent release with time in Table 2.

TABLE 2

| HOURS | NITRITE | NITRATE | MOLYBDATE |
|---|---|---|---|
| 43 | 0 | 0 | 0 |
| 90 | 11.4 | 11.3 | 8.9 |
| 162 | 14.0 | 14.2 | 10.2 |
| 215 | 21.3 | 21.1 | 18.1 |
| 258 | 29.1 | 29.1 | 25.1 |
| 330 | 41.7 | 40.2 | 31.5 |
| 402 | 53.1 | 55.6 | 41.1 |
| 498 | 70.3 | 62.9 | 59.8 |
| 598 | 77.8 | 79.6 | 62.9 |
| 666 | 89.7 | 94.0 | 72.0 |
| 763 | 94.4 | 95.8 | 76.6 |
| 835 | 101* | 105* | 81.0 |
| 931 | 105* | 104* | 87.2 |

*Release factor greater than 100% was due to statistical variations in concentration measurements.

As the data indicate, the ingredients were released gradually with time from the inner DCA-4+tablet core into the outside test solution. An effective and substantially complete release was reached for nitrite and nitrate at approximately 800 hours, and for molybdate, expectedly, at approximately 1,100 hours.

Using the same flask protocol and conditions as described above, other coolant additive compositions were tested. Table 3 shows the slow release data (% release) for EMULEX VV575 at 22.3% coating on DCA-4+tablets. Table 4 shows the slow release data (% release) for EMULEX W575 at 18.2% coating on DCA-4+tablets. Table 5 shows the slow release data (% release) for NeoCAR 820 (an acrylate-vinylversatate copolymer) at 30% coating on DCA-4+tablets. Table 6 shows the slow release data (% release) for ETHOCEL S45 at 5% coating on DCA-4+tablets. Table 7 shows the slow release data of ETHOCEL S45 at 15% coating on DCA-4+tablets.

These data indicate that the ingredients were released gradually with time from the inner DCA-4+tablet core into the outside test solution. Furthermore, as expected, the release rates for the additives are inversely proportional to the percentages of coating, i.e., coating by EMULEX VV575 at 26.8% (Table 2) has slower release rates of the additive components than at 22.3% (Table 3) and 18.2 (Table 4), respectively. Also, with the ETHOCEL polymer, the release rates for the additives are shown to be inversely proportional to the percentages of coating (Tables 6 and 7).

TABLE 3

| HOURS | NITRITE | NITRATE | MOLYBDATE |
|---|---|---|---|
| 43 | 0 | 0 | 0 |
| 90 | 9.9 | 9.4 | 8.0 |
| 162 | 19.8 | 22.3 | 17.2 |
| 215 | 43.6 | 46.5 | 38.3 |
| 258 | 49.4 | 49.8 | 39.2 |
| 330 | 69.2 | 72.3 | 59.5 |
| 402 | 91.3 | 91.5 | 75.8 |
| 498 | 102.0* | 98.3 | 80.9 |
| 598 | 99.1 | 99.1 | 83.4 |

*Release factor greater than 100% was due to statistical variations in concentration measurements.

TABLE 4

| HOURS | NITRITE | NITRATE | MOLYBDATE |
|---|---|---|---|
| 43 | 14.4 | 14.7 | 12.2 |
| 90 | 54.3 | 55.1 | 41.1 |
| 162 | 84.2 | 81.8 | 67.2 |
| 258 | 101* | 102* | 84.1 |

*Release factor greater than 100% was due to statistical variations in concentration measurements.

TABLE 5

| HOURS | NITRITE | NITRATE | MOLYBDATE |
|---|---|---|---|
| 43 | 0 | 0 | 0 |
| 90 | 0 | 0 | 0 |
| 162 | 0 | 2.4 | 0 |
| 215 | 0.7 | 3.5 | 2.2 |
| 258 | 8.7 | 9.6 | 8.3 |
| 330 | 10.6 | 11.8 | 9.8 |
| 402 | 12.2 | 13.1 | 11.2 |
| 498 | 22.5 | 21.8 | 21.0 |
| 598 | 28.5 | 29.0 | 25.4 |
| 666 | 30.6 | 30.1 | 27.1 |
| 788 | 34.9 | 34.9 | 31.3 |
| 835 | 36.0 | 41.9 | 35.4 |
| 931 | 38.0 | 43.9 | 36.0 |
| 1002 | 38.9 | 44.8 | 36.3 |

TABLE 6

| HOURS | NITRITE | NITRATE | MOLYBDATE |
|---|---|---|---|
| 66 | 62.6 | 57.0 | 41.2 |
| 162 | 76.5 | 67.5 | 48.1 |
| 216 | 81.3 | 73.9 | 53.3 |
| 429 | 86.1 | 79.2 | 56.4 |
| 525 | 90.0 | 82.5 | 58.1 |
| 602 | 92.7 | 85.8 | 61.2 |

TABLE 7

| HOURS | NITRITE | NITRATE | MOLYBDATE |
|---|---|---|---|
| 28 | 1.0 | 6.7 | 0 |
| 71 | 25.0 | 25.8 | 17.8 |
| 143 | 45.8 | 49.5 | 38.0 |
| 244 | 53.7 | 57.2 | 48.5 |
| 407 | 62.4 | 69.1 | 57.2 |
| 479 | 72.5 | 74.4 | 71.8 |
| 579 | 74.2 | 79.3 | 72.7 |
| 743 | 79.6 | 84.1 | 76.5 |
| 892 | 80.8 | 84.6 | 80.1 |
| 1012 | 88.8 | 90.6 | 83.3 |

The performance of vinylacetate-vinylversatate (EMULTEX VV575), as a coating for DCA-4+tablet, a coolant additive, was also tested on a rig to simulate an engine coolant system. DCA-4+tablets coated with 26.86 of EMULTEX VV575 were tested. The rig has three major components: a reservoir tank, a radiator and a pump. A heating element was installed inside the tank. In the experiment, a total of 18.4 liters of test coolant solution was added into the system. This system is similar to that of the one disclosed by Mitchell et al in U.S. Pat. No. 6,010,639, the disclosure of which is incorporated in its entirety by reference herein.

A Fleetguard WF2121 filter was used for the study. It contained a total of 187 pieces of coated DCA-4+tablets inside the center tube of the filter.

After the filter was screwed onto the test rig between the reservoir and the radiator, the pump was started to begin the experiment as the test solution was circulated throughout the system. The flow rate of test solution through the filter was kept at about 1.2 to about 1.5 gallons per minute and the temperature of the bulk test solution was kept at about 190±5 degrees F. After every 10 days of running, the system was shut off for 12–48 hours before it was restarted.

Samples were collected with time, analyzed and the percent release of ingredients was calculated, similarly to the experiment in the flask above. Table 3 shows the percent release of the additives with time in a rig.

TABLE 8

| HOURS | NITRITE | NITRATE | MOLYBDATE |
|---|---|---|---|
| 43 | 0.5 | 2.1 | 1.2 |
| 90 | 1.6 | 2.1 | 1.9 |
| 162 | 4.2 | 4.9 | 3.7 |
| 215 | 6.1 | 6.2 | 5.2 |
| 260 | 7.8 | 7.6 | 6.5 |
| 354 | 12.3 | 11.6 | 9.4 |
| 402 | 13.2 | 12.9 | 10.0 |
| 498 | 16.0 | 13.7 | 12.1 |
| 598 | 18.7 | 16.1 | 14.4 |
| 666 | 20.2 | 18.3 | 15.4 |
| 714 | 23.9 | 21.3 | 18.4 |
| 790 | 26.3 | 27.2 | 21.2 |
| 835 | 31.9 | 31.6 | 26.2 |
| 931 | 35.2 | 37.1 | 29.7 |
| 1000 | 43.3 | 44.1 | 35.2 |
| 1100 | 56.3 | 58.1 | 47.5 |
| 1192 | 69.8 | 74.1 | 57.6 |
| 1290 | 77.0 | 82.1 | 64.7 |
| 1390 | 82.0 | 82.4 | 67.7 |
| 1552 | 84.1 | 84.4 | 69.8 |
| 1720 | 89.4 | 95.0 | 75.0 |
| 1985 | 92.3 | 95.3 | 75.3 |

Again, as the data demonstrate, the ingredients were released gradually from the inner DCA-4+tablet core into the outside test coolant solution. The release rate was significantly slower for every ingredient compared to that from the experiment in the flask.

The following example provides those of ordinary skill in the art with specific methods to produce the controlled release coolant additive composition within the scope of the present invention and is not intended to limit the scope of the invention.

Method for making the controlled release coolant additive composition.

Fleetguard DCA-4+tablets were used. They are composed of nitrite, nitrate, phosphate, silicate, borate, molybdate, tolyltriazole, organic acid, scale inhibitors, surfactants and defoamers. The powdery ingredients were mixed first, then pressed into standard-cup tablets using ⅜" tooling. The tablets were of about 1.10 grams in weight and about 8 to about 15 kps in hardness. The Drum Coater was used for coating.

For coating the DCA-4+tablets, the DCA-4+standard-cup tablets were placed onto the rotating pan inside the drum coater. While the pan was being rotated, EMULTEX VV575 dispersion was pumped and sprayed through a nozzle onto the tablet surface. The spray rate is important. It was maintained at about 15 grams of dispersion per minute. The spray pattern was controlled to give a good mist of polymer droplets.

At the same time, through a very slightly reduced pressure, a stream of warm air of about 40 degrees C was passed through the coating chamber to remove the water vapor from the polymer mist (or small droplets), before and after they reached the tablet surface.

With time, the polymer gradually formed a layer of coating on the tablet. After all polymer dispersion was sprayed to reach the desired thickness of coating, the resulting coated tablets were allowed to stay on the rotating pan for a few more minutes, then were decanted from the pan into container for storage.

While this invention has been described with respect to various specific examples and embodiments, it is to be understood that the invention is not limited thereto and that it can be variously practiced with the scope of the following claims.

What is claimed is:

1. A controlled release coolant additive composition for use in an engine coolant system comprising:
    a core comprising a coolant additive component; and
    an insoluble coating substantially surrounding the core, the coating including polymers made up of units derived from vinylacetate and vinylversatate, wherein about 45% to about 90% by weight of the units are derived from vinylacetate and about 10% to about 55% by weight of the units are derived from vinylversatate.

2. The controlled release coolant additive composition of claim 1, wherein the weight percent of the coating is about 1% to about 40% based on the total weight of the controlled release coolant additive composition.

3. The controlled release coolant additive composition of claim 1, wherein the weight percent of the coating is about 10% to about 35% based on the total weight of the controlled release coolant additive.

4. The controlled release coolant additive composition of claim 1, wherein said coolant additive component comprises at least one active ingredient selected from the group consisting of buffering components, cavitation liner pitting inhibitors, metal corrosion and hot surface corrosion inhibitors, defoaming agents, hot surface deposition and scale inhibitors, dispersant agents, organic acids, surfactants and mixtures thereof.

5. The controlled release coolant additive composition of claim 1, wherein said coolant additive component comprises a mixture of (a) at least one alkali metal molybdate and (b) at least one alkali metal nitrite.

6. The controlled release coolant additive composition of claim 5, wherein said coolant additive component further comprises at least one other coolant additive selected from the group consisting of alkali metal phosphates, alkali metal borates, alkali metal nitrates, alkali metal silicates, alkali metal salts of one or more dicarboxylic acids and tolyltriazole.

7. The controlled release coolant additive composition of claim 1, wherein said core further comprises an amount of a binder sufficient to maintain said core in the form of a tablet or pellet.

8. The controlled release coolant additive composition of claim 7, wherein said binder is selected from the group consisting of polyvinyl pyrrolidone, sodium acrylate, sodium polyacrylate, carboxymethylcellulose, sodium carboxymethylcellulose, sodium hydroxypropyl-cellulose, corn starch, microcrystalline cellulose, propylene glycol, ethylene glycol, sodium silicate, potassium silicate, methacrylate/acrylate copolymers, and sodium lignosulfonate.

9. The controlled release coolant additive composition of claim 1, wherein said core further comprises a die release agent.

10. The controlled release coolant additive composition of claim 1, wherein about 35% to about 55% of the units are units derived from vinylversatate.

11. A controlled release coolant additive composition for use in an engine coolant system comprising:
a core comprising a coolant additive component; and
an insoluble coating substantially surrounding the core, the coating including homopolymers made up of units derived from ethylcellulose in an amount to maintain the insolubility of the coating at temperatures between about 170° F. and 210° F.

12. A method of maintaining an effective concentration of at least one engine coolant additive component in an engine coolant system comprising introducing into said engine coolant system by circulating at least a portion of the coolant in the cooling system through a coolant filter in which a controlled release coolant additive composition is disposed, said controlled release coolant additive composition comprising:
a core comprising a coolant additive component; and
an insoluble coating substantially surrounding the core, the coating including polymers made up of units derived from vinylacetate and vinylversatate, wherein about 45% to about 90% by weight of the units are derived from vinylacetate and about 10% to about 55% by weight of the units are derived from vinylversatate.

13. The method of claim 12, wherein the coating is spray coated onto said core.

14. The method of claim 12, wherein the weight percent of the coating is about 1% to about 40% based on the total weight of the controlled release coolant additive composition.

15. The method of claim 12, wherein the weight percent of the coating is about 10% to about 35% based on the total weight of the controlled release coolant additive composition.

16. The method of claim 12, wherein said coolant additive component further comprises at least one active ingredient selected from the group consisting of buffering components, cavitation liner pitting inhibitors, metal corrosion and hot surface corrosion inhibitors, defoaming agents, hot surface deposition and scale, inhibitors, dispersant agents, organic acids, surfactants and mixtures thereof.

17. The method in accordance with claim 12, wherein said coolant additive component comprises a mixture of (a) at least one alkali metal molybdate and (b) at least one alkali metal nitrite.

18. The method of claim 17, wherein said coolant additive component further comprises at least one other coolant additive selected from the group consisting of alkali metal phosphates, alkali metal borates, alkali metal nitrates, alkali metal silicates, alkali metal salts of one or more neutralized dicarboxylic acids and tolyltriazole.

19. A controlled release coolant additive composition for use in an engine coolant system comprising:
a core comprising a coolant additive component; and
an insoluble coating substantially surrounding the core, the coating including polymers made up of units from no more than two monomers, wherein about 10% to about 55% by weight of the units are derived from vinylversatate, and the other units are derived from an ethylenically unsaturated monomer other than vinylversatate.

20. The controlled release coolant additive composition of claim 19, wherein about 35% to about 55% of the units are units derived from vinylversatate.

21. A controlled release coolant additive composition for use in an engine coolant system comprising:
a core comprising a coolant additive component; and
an insoluble coating substantially surrounding the core, the coating including polymers made up of units from no more than two monomers, wherein about 45% to about 90% by weight of the units are derived from vinylacetate, and the other units are derived from an ethylenically unsaturated monomer other than vinylacetate.

22. A controlled release coolant additive composition for use in an engine coolant system comprising:
a core comprising a coolant additive component; and
an insoluble coating substantially surrounding the core, the coating including polymers made up of units from no more than two monomers, wherein at least about 35% by weight of the units are derived from vinylversatate.

* * * * *

UNITED STATES PATENT AND TRADEMARK OFFICE
CERTIFICATE OF CORRECTION

PATENT NO. : 6,607,694 B1
DATED : August 19, 2003
INVENTOR(S) : Blakemore et al.

It is certified that error appears in the above-identified patent and that said Letters Patent is hereby corrected as shown below:

Title page,
Item [75], Inventors, "Naper Ville, IL" should read -- Naperville, IL --.

Column 6,
Line 41, "and.sodium" should read -- and sodium --.

Column 9,
Line 64, "W575" should read -- VV575 --.

Column 11,
Line 18, "26.86" should read -- 26.8% --.

Column 14,
Line 13, "scale, inhibitors" should read -- scale inhibitors --.

Signed and Sealed this

Seventeenth Day of February, 2004

JON W. DUDAS
*Acting Director of the United States Patent and Trademark Office*